(12) United States Patent
Youssef-Agha et al.

(10) Patent No.: US 6,276,754 B1
(45) Date of Patent: Aug. 21, 2001

(54) CHILD SEAT ATTACHMENT ASSEMBLY

(75) Inventors: Wael Youssef-Agha, Rochester Hills; Doug Sweeting, Livonia, both of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/553,661

(22) Filed: Apr. 21, 2000

(51) Int. Cl.$^7$ .................................................... B60N 2/28
(52) U.S. Cl. ..................... 297/253; 297/250.1; 24/682.1; 248/65
(58) Field of Search ................................ 297/250.1, 253, 297/216.11; 24/682.1; 248/65, 74.2

(56) References Cited

U.S. PATENT DOCUMENTS

| | | |
|---|---|---|
| 4,673,151 * | 6/1987 | Pelz ...................................... 248/65 X |
| 5,466,044 | 11/1995 | Barley et al. ...................... 297/253 X |
| 5,487,588 | 1/1996 | Burleigh et al. ...................... 297/253 |
| 5,816,651 | 10/1998 | Feuerherdt . |
| 5,918,934 | 6/1999 | Siegrist .............................. 297/250.1 |
| 5,941,600 | 8/1999 | Mar et al. . |
| 5,941,601 | 8/1999 | Scott et al. ............................. 297/253 |
| 6,030,046 | 2/2000 | Dorow .......................... 297/250.1 X |
| 6,082,818 * | 7/2000 | Muller ............................... 297/250.1 |

* cited by examiner

Primary Examiner—Peter R. Brown
(74) Attorney, Agent, or Firm—MacMillan, Sobanski & Todd, LLC

(57) ABSTRACT

An attachment assembly for securing a child safety seat to a vehicle seat having a laterally extending cross member includes a cross member which is secured relative to the vehicle seat. The cross member includes first and second mounting surfaces which extend laterally across the seat. The first mounting surface is different from the second mounting surface. The attachment bracket further includes an attachment bracket which is secured to the cross member. The attachment bracket includes a first leg secured to the first mounting surface, and a second leg secured to the second mounting surface. The attachment bracket further includes a latch receiving portion which interconnects the first leg and the second leg. The latch receiving portion is adapted to be releasably engaged with a corresponding latch mechanism on a child safety seat.

20 Claims, 3 Drawing Sheets

CHILD SEAT ATTACHMENT ASSEMBLY

BACKGROUND OF THE INVENTION

This invention relates in general to child safety seats for use in passenger vehicles, and in particular to a restraint attachment assembly for use in securing a child safety seat to a passenger seat.

Automotive child safety seats have typically been secured to passenger seats of a vehicle using straps, such as the existing seat belt for adult passengers. The ends of the seat belt are anchored to structural members of the automobile. The seat belt is directed through apertures or slots formed in the child safety seat, thereby securing the child seat relative to the seat belt. It is often laborious and sometimes complicated to fasten the child safety seat by means of the seat belt. Due to the flexible nature of the seat belt, the position of the child seat may also shift during operation of the vehicle.

To overcome these problems associated with securing a child safety seat with the existing seat belt, various regulations have been implemented requiring standardized structures and methods for securing child seats within an automobile. One such regulation was promulgated by the U.S. National Highway Traffic Safety Administration, entitled "Federal Motor Vehicle Safety Standards; Child Restraint Systems; Child Restraint Anchorage Systems", (64 FR 10786). The regulation requires that motor vehicle manufacturers provide a new way of installing child seats that are standardized and independent of the vehicle seat belts by use of a new anchorage system. Suitable child safety seats will include restraints or latches for coupling to the anchorage systems.

There is illustrated in FIGS. 1 through 3 a child safety seat 10 coupled to a vehicle passenger seat 12 by means of a prior art attachment assembly, indicated generally at 14. The attachment assembly 14 is an example of an anchorage system corresponding to the above mentioned regulation. The attachment assembly 14 includes a pair of spaced apart brackets 16 which are fastened to a cross member 18. The cross member 18 extends laterally across the seat 12 and is secured relative to the vehicle seat 12 to provide a rigid support for transmitting the load or force from the child seat 10 upon impact or rapid deceleration of the vehicle, as described in detail below. The cross member 18 is formed from a hollow tube having a generally circular continuous cross-sectional shape.

The brackets 16 are identical in structure and function. The brackets 16 are formed from a rod having a continuous circular cross-sectional shape. As best shown in FIGS. 2 and 3, the brackets 16 are generally U-shaped having a pair of legs 20 extending from ends of a cross bar 22. The legs 20 are identical in shape and have elongated parallel straight portions 23 and end portions 24. The straight portions 23 extend in a rearward direction from the cross bar 22 and curve downward in an arcuate shape following an upper rear contour of the cross member 18 to form the end portions 24. The end portions 24 of the legs 20 partially wrap around an upper arcuate surface 26 of the cross member 18. The end portions 24 are welded to the cross member 18 along their entire arcuate length. The arcuate surface 26 extends longitudinally along the length of the cross member 18. All of the end portions 24 of the legs 20 of both pairs of brackets 16 are secured along the arcuate surface 26.

As shown in FIG. 1, the straight portions 23 and the cross bar 22 of the brackets 16 extend slightly outwardly or protrude from the intersection of a seat bottom 12a and seat back 12b of the seat 10. The cross bars 22 function as receiving portions for the coupling of a pair of corresponding latch mechanisms 30 secured to the child seat 10. The latch mechanisms 30 are located on opposed bottom side corners of the child seat 10.

The forces imparted from the child seat 10 upon rapid deceleration of the vehicle are transmitted through the latch mechanisms 30, the brackets 16, and the cross member 18. During a forward load, in which the child seat 10 is propelled in a forward direction, as indicated by an arrow 32 in FIGS. 1 and 2, all of the legs 20 are substantially in tension. Note that the straight portions 23 can be angled slightly upward, as shown in FIG. 1, or can be substantially horizontal, as shown in FIG. 3.

During a lateral load, in which the child seat 10 is propelled in either lateral direction of the vehicle, as indicated by an arrow 34 in FIG. 2 (perpendicular to the forward direction 32) a moment is created about the center of gravity of the child seat 10 such that one of the latch mechanisms 30 pulls on its corresponding bracket 16, while the other latch mechanisms 30 pushes against its corresponding bracket 16. This lateral load causes the straight portions of one of the brackets 16 to be in tension, and causes the straight portions 23 of the other bracket 16 to be in compression. The bracket 16 which is substantially in tension generally provides adequate force resistance and generally does not deflect by a substantial undesirable distance in the forward direction 32. However, for the bracket 16 which is substantially in compression, the elongated straight portions 23 will crumble or tend to fold on themselves under sufficient force, which can cause the latch mechanism 30 and child seat 10 to deflect a substantial undesirable distance in a rearward direction, opposite from the forward direction 32, and also in the lateral direction 34. During a lateral load, the forces will generally also impart a bending load at an intermediate portion 36 between the straight portions 23 and the end portions 24 of the legs 20 of the brackets 16. During a lateral load situation the end portions of the brackets 16 defined by the cross bar 22 can move a substantial undesirable distance in the lateral directions 34. Generally, the longer the straight portions 23 of the brackets 16 extend from the cross member 18, the larger the cross bars 22, and subsequently the child seat 10, will deflect.

Since the center of gravity of the child seat 10 is located above the attachment assembly 14, a lateral force imposed from the child seat 10 may impart an upward force on one of the brackets 16. During an upward load, in which the latch mechanism 30 is propelled in an upward direction, as indicated by an arrow 38 in FIGS. 1 and 3, the corresponding bracket 16 will bend in a similar manner as when subjected to a lateral load, i.e., a bending load is imparted at the intermediate portion 36 of the legs 30, which may also result in a substantial bending distance of the cross bar 22 of the bracket 16. Of course, the brackets 16 can be subjected to any combination of forward, lateral, upward, and downward forces.

BRIEF SUMMARY OF THE INVENTION

This invention relates to an attachment member for securing a child safety seat to a passenger seat. The attachment assembly includes a cross member which is secured relative to the vehicle seat. The cross member includes first and second mounting surfaces which extend laterally across the seat. The first mounting surface is different from the second mounting surface. The attachment bracket further includes an attachment bracket which is secured to the cross member. The attachment bracket includes a first leg secured to the first mounting surface, and a second leg secured to the second mounting surface. The attachment bracket further includes a latch receiving portion which interconnects the first leg and the second leg. The latch receiving portion is adapted to be releasably engaged with a corresponding latch mechanism on a child safety seat.

In a preferred embodiment of the invention, the attachment assembly includes first and second attachment brackets attached to the cross member. The first attachment bracket includes a first outboard leg secured to the first mounting surface, a first inboard leg secured to the second mounting surface, and a first latch receiving portion interconnecting the first outboard leg and the first inboard leg. The second attachment bracket includes a second outboard leg secured to the first mounting surface, a second inboard leg secured to the second mounting surface, and a second latch receiving portion interconnecting the second outboard leg and the second inboard leg. The first and second inboard legs are positioned between said first and second outboard legs.

Various objects and advantages of this invention will become apparent to those skilled in the art from the following detailed description of the preferred embodiment, when read in light of the accompanying drawings.

DETAILED DESCRIPTION OF THE INVENTION

Figure 2:
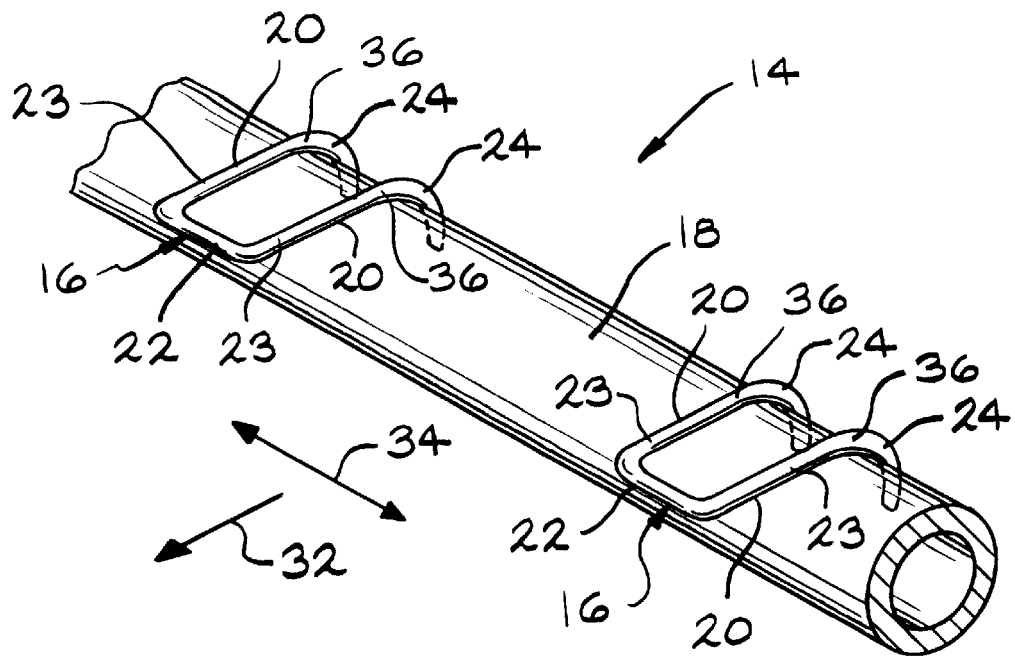
FIG. 2 is a perspective view of the prior art attachment assembly of FIG. 1.
Figure 3:
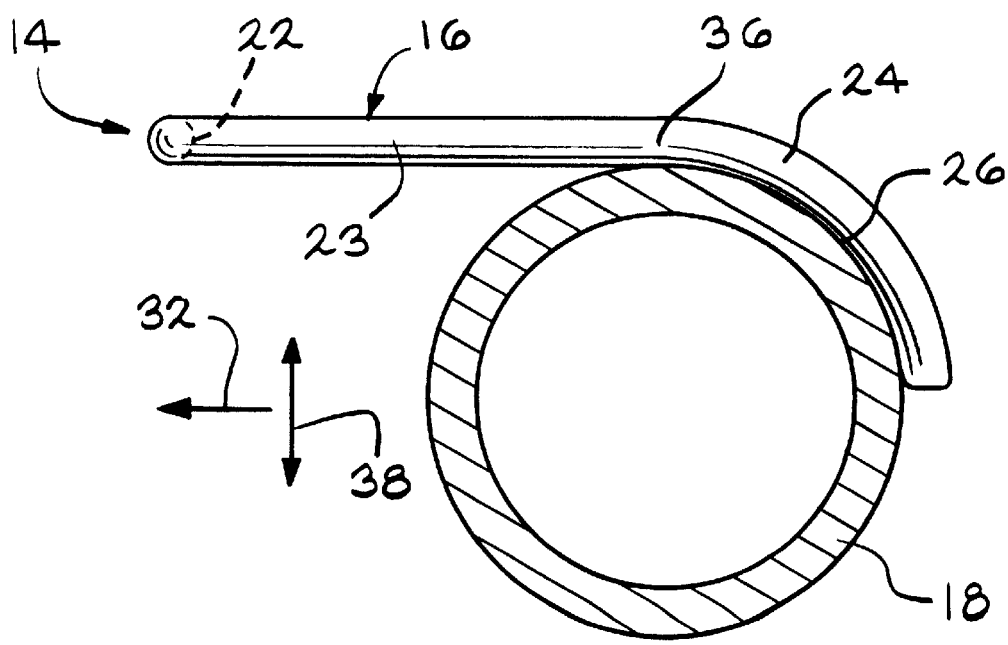
FIG. 3 is a partial sectional side view of the prior art attachment assembly of FIGS. 1 and 2.
Figure 4:
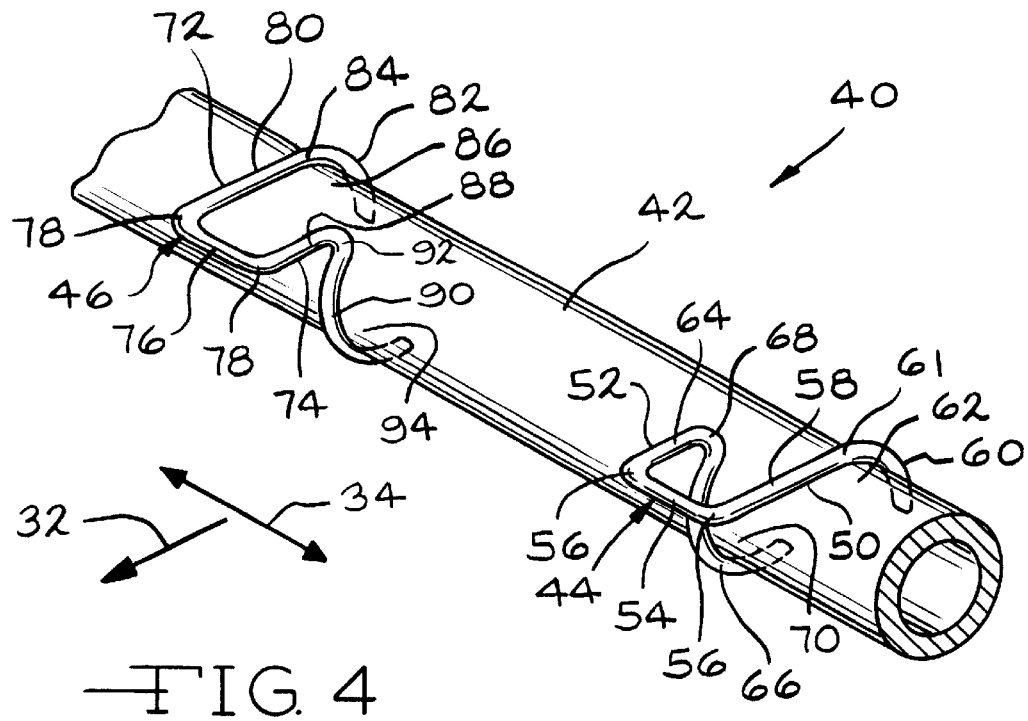
FIG. 4 is a perspective view of an attachment assembly, in accordance with the present invention, for coupling a child safety seat to a vehicle passenger seat.
Figure 5:
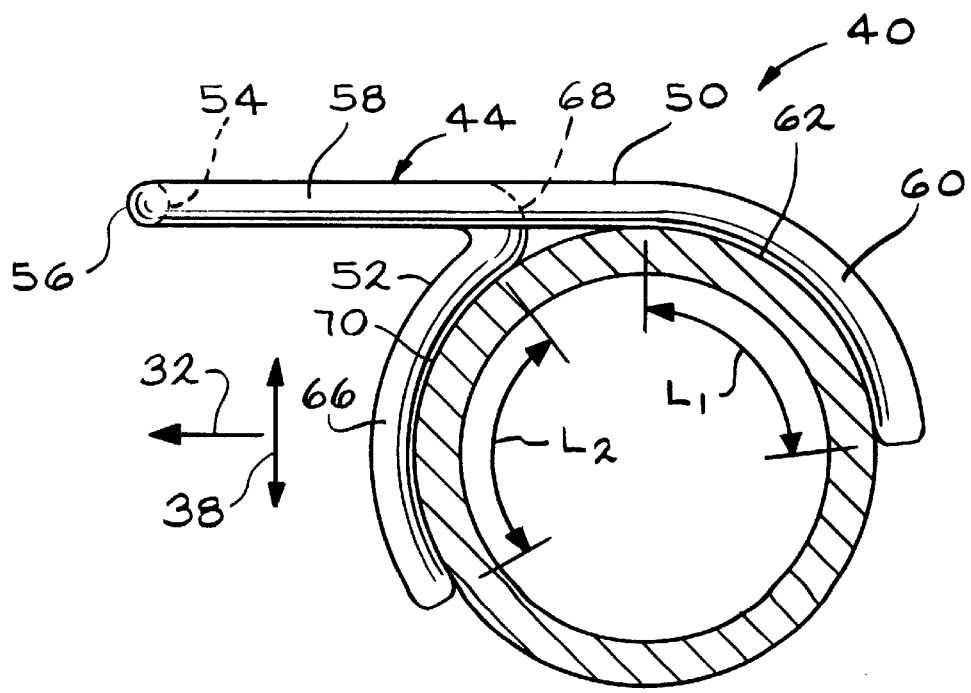
FIG. 5 is a partial sectional side view of the attachment assembly of FIG. 4.

Referring now to the drawings, there is illustrated in FIGS. 4 and 5 an attachment assembly, indicated generally at 40, in accordance with the present invention. The attachment assembly 40 can be used in place of the attachment assembly 14 of FIGS. 1 through 3 for attaching the child safety seat 10 to the passenger seat 12. The attachment assembly 40 includes a cross member 42 which is similar in structure and function to the cross member 18 of the attachment assembly 14. The cross member 42 extends laterally across the seat 12 and is secured relative to the seat 12 to provide a rigid support for transmitting the load or force from the child seat 10 upon impact or rapid deceleration of the vehicle, as will be described in detail below. For example, the cross member 42 can be attached directly to the seat 12 or can be fastened to other structures of the vehicle, such as a floor or sides (not shown) of the vehicle. The cross member 42 may even be an integral structure of the vehicle floor and not a separate structure, as shown in FIGS. 4 and 5. Preferably, the cross member 42 has a hollow tubular circular and continuous cross-sectional shape, as shown in FIGS. 4 and 5. However, it should be understood that the cross member 42 can have any suitable cross sectional shape that provides a rigid support.

The attachment assembly 40 further includes a pair of brackets, indicated generally at 44 and 46. The brackets 44 and 46 are attached to the cross member 42 in a spaced apart relationship laterally along length of the cross member 42. Preferably, each of the brackets 44 and 46 are formed from a single length of steel wire or rod having a generally circular and continuous cross-sectional shape which is bent to form the desired shape. However, it should be understood that the brackets 44 and 46 can be formed from any suitable rigid material having a desired shape, in accordance with the present invention. For example, the brackets 44 and 46 could be formed from a stamped and formed metallic plate.

The brackets 44 and 46 are similar in shape, but preferably not exactly the same shape. Preferably, the shapes of the brackets 44 and 46 are generally mirror image with respect to one another, as shown in FIG. 4.

Referring to both FIGS. 4 and 5, the bracket 44 generally includes an outboard leg 50, an inboard leg 52, and a cross bar 54. The legs 50 and 52 extend from ends 56 of the cross bar 54. The cross bar 54 is similar in function and structure to the cross bar 22 of the brackets 16 illustrated in FIGS. 1 through 3. The cross bar 22 functions as a receiving portion for the coupling of a corresponding latch mechanism, such as the latch mechanism 30 of the child safety seat 10 illustrated in FIG. 1. The latch mechanism 30 can be any suitable device, such as a buckle, clip or latch for securing the child safety seat 10 to the cross bar 22 of the bracket 16. The spacing of the cross bars of the brackets 44 and 46 corresponds to the spacing between the latch mechanisms 30 of the child safety seat 10.

The outboard leg 50 of the bracket 44 generally includes a relatively straight portion 58, an end portion 60, and an intermediate portion 61. The intermediate portion 61 defines the transition between the straight portion 58 and the end portion 60. The straight portion 58 extends from one of the ends 56 of the cross bar 54 in a rearward direction towards an upper portion of the cross member 42. The end portion 60 curves downward in an arcuate shape following and conforming to the contour of a first mounting surface 62 of the cross member 42. The first mounting surface 62 has an arcuate shape and extends longitudinally along the length of the cross member 42. As shown in FIG. 5, the first mounting surface 62 is defined by an arcuate outer perimeter surface of the cross member 42 having an arcuate length $L_1$. Since the cross member 42 extends laterally across the seat 12, the first mounting surface 62 also extends in a direction laterally across the seat 12. Preferably, the end portion 60 of the outboard leg 50 is welded to the first mounting surface 62 along the entire length of the end portion 60. Of course, the end portion 60 can be fastened to the first mounting surface 62 by any suitable means, such as by clamps or fasteners.

The inboard leg 52 of the bracket 44 generally includes a relatively straight portion 64, and end portion 66, and an intermediate portion 68. The intermediate portion 68 defines the transition between the straight portion 64 and the end portion 66. The straight portion 64 extends from an end 56 of the cross bar 54 in a rearward direction towards an upper portion of the cross member 42. The straight portion 64 is preferably parallel with the straight portion 58 of the outboard leg 50. Note that the straight portion 64 of the inboard leg 52 is significantly shorter in length than the straight portion 58 of the outboard leg 50. The end portion 66 curves downward in an arcuate shape following and conforming to the contour of a second mounting surface 70 of the cross member 42. The second mounting surface 70 is different from the first mounting surface 62. The second mounting surface 70 has an arcuate shape and extends longitudinally along the length of the cross member 42. As shown in FIG. 5, the second mounting surface 70 is defined by an arcuate outer perimeter surface of the cross member 42 having an arcuate length $L_2$. As shown in FIG. 5, the first mounting surface 62 is located at an upper rear portion of the cross member 42, and the second mounting surface 70 is located at a front side portion of the cross member 42. Generally, the first mounting surface 62 and the second mounting surface 70 are disposed on respective opposite sides of the cross member 42. Of course, the first and second mounting surfaces 62 and 70 do not have to be oriented exactly at opposite sides of the cross member 42 such that they are oriented at 180 degrees from one another. Since the cross member 42 extends laterally across the seat 12, the second mounting surface 70 also extends in a direction laterally across the seat 12. Preferably, the end portion 66 of the inboard leg 52 is welded to the second mounting surface 70 along the entire length of the end portion 66. Of course, the end portion 66 can be fastened to the second mounting surface 70 by any suitable means, such as by clamps or fasteners.

As stated before, the brackets 44 and 46 are similar in shape such that they are generally mirror image with respect to one another. Similar features of the bracket 46 will be labeled with a like name corresponding to the similar feature of the bracket 44. The bracket 46 generally includes an outboard leg 72, an inboard leg 74, and a cross bar 76. The legs 72 and 74 extend from ends 78 of the cross bar 76. The cross bar 76 is similar in function and structure to the cross bar 54 of the bracket 44. The cross bar 76 functions as a receiving portion for the coupling of a corresponding latch mechanism of the child safety seat 10. The inboard legs 52 and 74 of the first and second brackets 44 and 46, respectively, are positioned closest to each other, while the outboard legs 58 and 72 are positioned farthest away from each other, as shown in FIG. 4.

The outboard leg 72 of the bracket 46 generally includes a relatively straight portion 80, an end portion 82, and an intermediate portion 84. The intermediate portion 84 defines the transition between the straight portion 80 and the end portion 82. The straight portion 80 extends from one of the ends 78 of the cross bar 76 in a rearward direction towards an upper portion of the cross member 42. The end portion 82 curves downward in an arcuate shape following and conforming to the contour of a third mounting surface 86 of the cross member 42. The third mounting surface 86 has an arcuate shape and extends longitudinally along the length of the cross member 42. Since the cross member 42 has a continuous cross-sectional shape, the third mounting surface 86 is the same as the first mounting surface 62 which extends along the length of the cross member 42. Preferably, the end portion 82 of the outboard leg 72 is welded to the third mounting surface 86 along the entire length of the end portion 82. Of course, the end portion 82 can be fastened to the third mounting surface 86 by any suitable means, such as by clamps or fasteners.

The inboard leg 74 of the bracket 46 generally includes a relatively straight portion 88, and end portion 90, and an intermediate portion 92. The intermediate portion 92 defines the transition between the straight portion 88 and the end portion 90. The straight portion 88 extends from an end 78 of the cross bar 76 in a rearward direction towards an upper portion of the cross member 42. The straight portion 88 is preferably parallel with the straight portion 88 of the outboard leg 72. Note that the straight portion 88 of the inboard leg 74 is significantly shorter in length than the straight portion 88 of the outboard leg 72. The end portion 90 curves downward in an arcuate shape following and conforming to the contour of a fourth mounting surface 94 of the cross member 42. The fourth mounting surface 94 is different from the third mounting surface 86. Since the cross member 42 has a continuous cross-sectional shape, the fourth mounting surface 94 is the same as the second mounting surface 70 which extends along the length of the cross member 42. Preferably, the end portion 90 of the inboard leg 74 is welded to the fourth mounting surface 94 along the entire length of the end portion 90. Of course, the end portion 90 can be fastened to the fourth mounting surface 94 by any suitable means, such as by clamps or fasteners.

Figure 1:
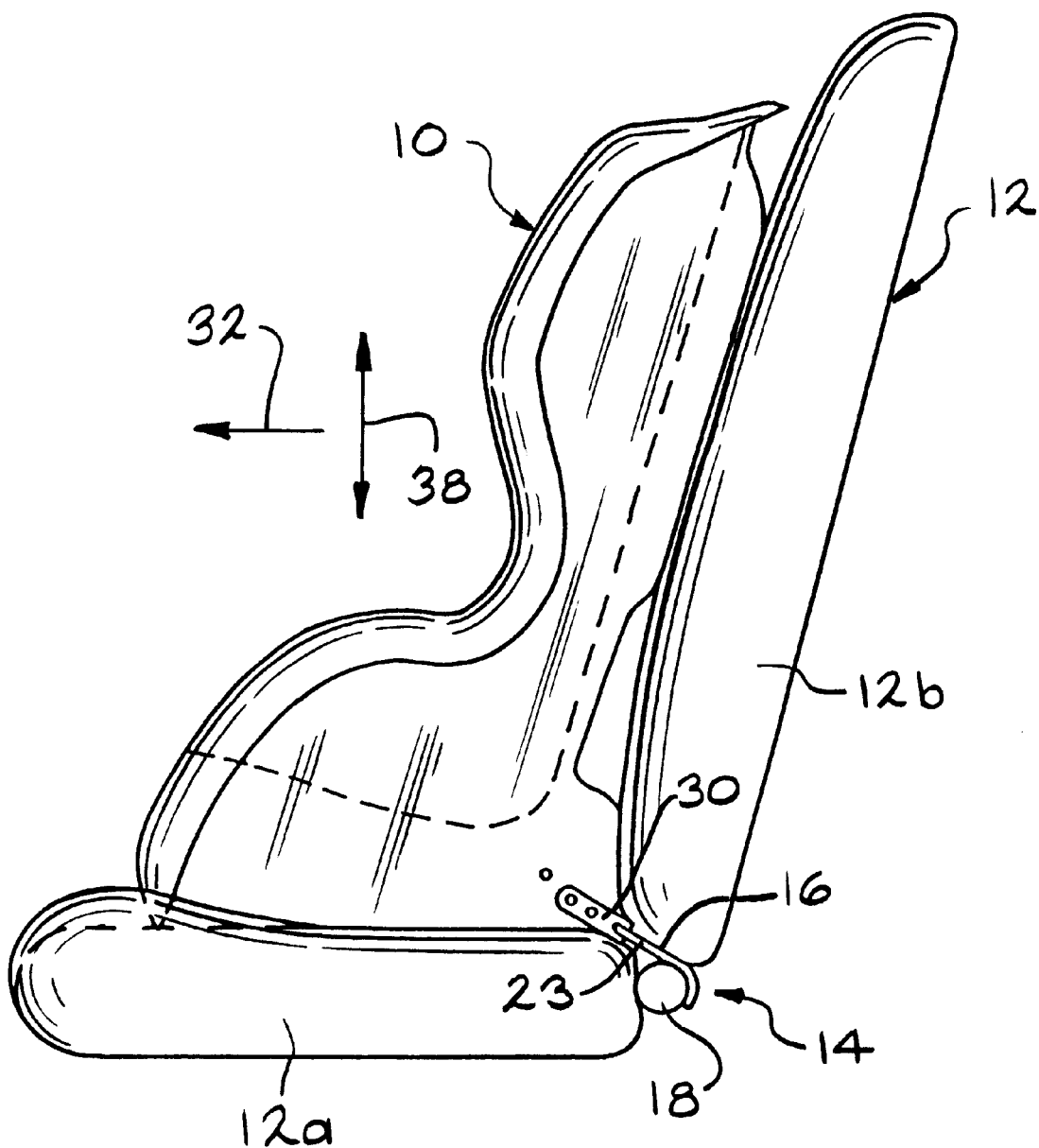
FIG. 1 is schematic side elevational view of a child safety seat coupled to a vehicle passenger seat by means of a prior art attachment assembly.

Although the straight portions 58, 64, 80, and 88 of the brackets 44 and 46 are shown extending in a generally horizontal direction in FIGS. 4 and 5, it should be understood that the straight portions 58, 64, 80, and 88 can extend at an angle with respect to the horizon, such as the straight portions 23 of the brackets 16, as shown in FIG. 1.

Upon impact or rapid deceleration of the vehicle, forces will be imparted from the child seat 10 to the cross member 42. The forces are transmitted through the latch mechanisms 30 of the child seat 10, the brackets 44 and 46, the cross member 42, and to the vehicle structure in which the cross member 42 is secured, such as the passenger seat 12. Generally, a tensile force acting upon the structures of the brackets 44 and 46 will cause less deflection of the cross bars 54 and 76, and therefore of the child seat 10, than a compressive or bending force acting upon the structures of the brackets 44 and 46.

During a forward force or load, in which the child seat 10 is propelled in the forward direction 32, the straight portions 58 and 64 of the legs 50 and 52, respectively, of the bracket 44, and the straight portions 80 and 88 of the legs 72 and 74, respectively, of the bracket 46 are substantially in tension. During a lateral load, in which the child seat 10 is propelled in either lateral direction 34, the forces a moment is created about the center of gravity of the child seat 10 such that one of the latch mechanisms 30 pulls on its corresponding bracket 44 or 66, while the other latch mechanism 30 pushes against its corresponding bracket 44 or 66. For example, if the child seat 10 is propelled in a leftward lateral direction 34, as viewing FIG. 4, the straight portions 58 and 64 of the respective legs 50 and 52 of the bracket 44 will be substantially in tension. The straight portion 80 of the leg 72 of the bracket 46 will be substantially in compression. However, upon an initial small deflection, the straight portion 88 of the leg 74 will be in tension. Since the straight portion 88 is in tension, the latch mechanism 30 and the child seat 10, is prevented from moving a substantial distance. Note that upon a sufficient force, the straight portion 88 may deflect slightly upwardly or laterally, bending about the intermediate portion 92, until the straight portion 88 is substantially in tension. The relatively short length of the straight portion 88 reduces the overall deflection of the child seat 10. Since, the end portion 90 of the inboard leg 74 is fastened to the front portion or the second mounting surface 70 of the cross member 42, and the end portion 82 of the outboard leg 72 is fastened to the rear portion or the first mounting surface 62 of the cross member, the corresponding latch mechanism 30 is generally supported from the front and rear of the cross member 42 in a tensile manner by the bracket 46.

During a lateral load, the forces will generally also impart a bending load at the intermediate portions 61 and 68 of the legs 50 and 52, respectively, of the bracket 44, and the intermediate portions 84 and 92 of the legs 72 and 74, respectively, of the bracket 46. Due in part to the relatively short length of the straight portions 64 and 88, the cross bars 54 and 76 will deflect only a relatively short distance until the straight portions 64 and 88 are primarily in tension.

Since the gravity of the child seat 10 is located above the attachment assembly 40, a lateral force imposed from the child seat 10 may impart an upward force on one or both of the brackets 44 and 46. During an upward load, in which the latch mechanism 30 is propelled in the upward direction 38, the corresponding bracket 44 and/or 46 will bend in a similar manner as when subjected to a lateral load, e.g., a bending load is imparted at the intermediate portions 61, 68, 84, and/or 92. Due in part to the relatively short length of the straight portions 64 and 88, the cross bars 54 and 76 will deflect only a relatively short distance until the straight portions 64 and 88 are primarily in tension.

The preferred embodiment of the attachment assembly 40 is illustrated in FIGS. 4 and 5. However, if desired, the brackets 44 and 46 could be configured such that the outboard legs 50 and 72 are interchanged with the inboard legs 52 and 74.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An attachment assembly for securing a child safety seat to a vehicle seat having a laterally extending cross member, the attachment assembly comprising:
    a cross member secured relative to a vehicle seat and including first and second mounting surfaces extending laterally across the seat, said first mounting surface being different from said second mounting surface; and
    an attachment bracket including:
    a first leg fixedly secured to said first mounting surface to prevent movement between said first leg and said first mounting surface;
    a second leg fixedly secured to said second mounting surface to prevent movement between said second leg and said second mounting surface; and
    a latch receiving portion interconnecting said first leg and said second leg, said latch receiving portion adapted to be releasably engaged with a corresponding latch mechanism on a child safety seat.

2. The attachment assembly of claim 1, wherein said first and second mounting surfaces are disposed on respective opposite sides of said cross member.

3. The attachment assembly of claim 1, wherein said first leg and said second leg have end portions shaped generally to conform with said first and second mounting surfaces, respectively.

4. The attachment assembly of claim 3, wherein said end portions are welded to said first and second mounting surfaces, respectively.

5. The attachment assembly of claim 1, wherein said cross member has a circular cross-section, said first and second mounting surface have arcuate surfaces defined by portions of an outer perimeter of said cross member.

6. The attachment assembly of claim 5, wherein said cross member is tubular having a hollow interior.

7. The attachment assembly of claim 1, wherein said attachment bracket is formed from a single length of rod having a generally continuous cross-section.

8. The attachment assembly of claim 7, wherein said cross-sectional shape of said rod has a generally circular outer perimeter.

9. The attachment assembly of claim 1, wherein said first leg has a first straight portion which is unattached to said first mounting surface, said second leg having a second straight portion which is unattached to said second mounting surface, and wherein said second straight portion is shorter in length than said first straight portion.

10. The attachment assembly of claim 1, wherein said cross member is secured directly to the vehicle seat.

11. An attachment assembly for securing a child safety seat of a vehicle seat having a laterally extending cross bar, the attachment assembly comprising:
    a cross member secured relative to a vehicle seat and including first and second mounting surfaces extending laterally across the seat, said first mounting surface being different from said second mounting surface;
    a first attachment bracket including:
    a first outboard leg fixedly secured to said first mounting surface to prevent movement between said first outboard leg and said first mounting surface;
    a first inboard leg fixedly secured to said second mounting surface to prevent movement between said first inboard leg and said second mounting surface; and
    a first latch receiving portion interconnecting said first outboard leg and said first inboard leg, said first latch receiving portion adapted to be releasably engaged with a corresponding first latch mechanism on a child safety seat;
    a second attachment bracket including:
    a second outboard leg fixedly secured to said first mounting surface to prevent movement between said second outboard leg and said first mounting surface;
    a second inboard leg fixedly secured to said second mounting surface to prevent movement between said second inboard leg and said second mounting surface; and
    a second latch receiving portion interconnecting said second outboard leg and said second inboard leg, said second latch receiving portion adapted to be releasably coupled to a corresponding second latch mechanism on the child safety seat, wherein said first and second inboard legs are positioned between said first and second outboard legs.

12. The attachment assembly of claim 11, wherein said first and second mounting surfaces are disposed on respective opposite sides of said cross member.

13. The attachment assembly of claim 11, wherein said first outboard leg and said second outboard leg have first end portions shaped generally to conform with said first mounting surface.

14. The attachment assembly of claim 11, wherein said first inboard leg and said second inboard leg have second end portions shaped generally to conform with said second mounting surface.

15. The attachment assembly of claim 11, wherein said cross member has a circular cross-section, said first and second mounting surface have arcuate surfaces defined by portions of an outer perimeter of said cross member.

16. The attachment assembly of claim 15, wherein said cross member is tubular having a hollow interior.

17. The attachment assembly of claim 11, wherein said first and second attachment brackets are each formed from a length of rod having a generally continuous cross-section.

18. The attachment assembly of claim 17, wherein said cross-sectional shape of said rods have a generally circular outer perimeter.

19. The attachment assembly of claim 11, wherein said first and second outboard legs have first straight portions which are unattached to said first mounting surface, said first and second inboard legs having second straight portions which are unattached to said second mounting surface, and wherein said second straight portions are shorter in length than said first straight portions.

20. The attachment assembly of claim 11, wherein said cross member is secured directly to the vehicle seat.

* * * * *